3,228,974
Patented Jan. 11, 1966

3,228,974
TRISOXYGENATED 3a,6-DIMETHYL - 6,10 - METHANO-1H-TETRADECAHYDROCYCLOOCT [e] INDENES
Norman W. Atwater, Arlington Heights, Ill., assignor to G. D. Searle & Co., Chicago, Ill., a corporation of Delaware
No Drawing. Filed Oct. 10, 1962, Ser. No. 229,752
11 Claims. (Cl. 260—488)

The present invention is concerned with novel trisoxygenated tetracyclic organic compounds and, more particularly, with 3,12-bisoxygenated 3a,6-dimethyl-6,10-methano - 1H - tetradecahydrocyclooct[e]indenes, oxygenated also at either the 9 or 11 position. These substances can be illustrated by the structural representation

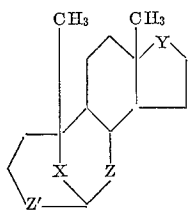

wherein X and Y can be a carbonyl, hydroxymethylene, or (lower alkanoyl)oxymethylene radical, Z is a carbonyl, β-hydroxymethylene, β - (lower alkanoyl)oxymethylene, or methylene radical, and Z' is a carbonyl, β-hydroxymethylene or methylene radical.

Examples of lower alkanoyl radicals encompassed in the foregoing formula are, typically, formyl, acetyl, propionyl, butyryl, valeryl, caproyl, and the branched-chain isomers thereof.

The ring system characteristic of the instant compounds with the positions properly numbered is shown below:

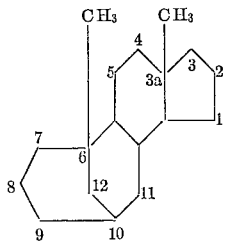

The compounds of this invention are conveniently manufactured by the cyclization of tricyclic γ'-carboalkoxy α,β-unsaturated ketones, represented by the structural formula

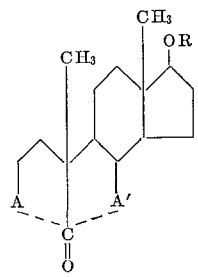

wherein R is hydrogen or an acyl radical and either A or A' is a carboalkoxy group while the other is a vinylene radical attached to the ketonic carbonyl group, as indicated by the dotted lines.

The triols of the present invention result from the reaction of the aforementioned starting materials with a suitable reducing agent, for example lithium aluminum hydride, in a suitable inert organic solvent such as tetrahydrofuran. The reaction of methyl 17β-benzoyloxy-5-oxo-5,7-seco-B-norandrost-3-en-7-oate, represented by the structural formula

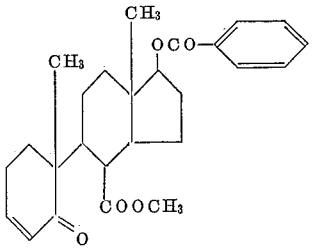

with lithium aluminum hydride in tetrahydrofuran affords a mixture of 3a,6-dimethyl - 6,10 - methano-1H-tetradecahydrocyclooct[e]indene - 3β,11β,12β - triol and 3a,6-dimethyl - 6,10 - methano-1H-tetradecahydrocyclooct[e]indene-3β,11β,12α-triol, which epimers are separated chromatographically. The analogous reaction of methyl 17β - benzoyloxy-5-oxo-3,5-seco-A-norandrost-6-en-3-oate of the structural formula

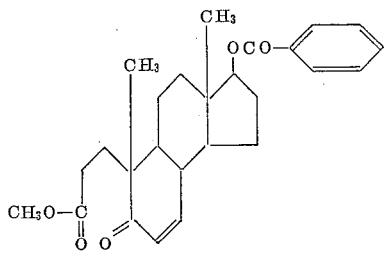

obtained from the corresponding 3,5-seco-A-norandrostan-3-oate by bromination and dehydrobromination, with lithium aluminum hydride in tetrahydrofuran results in 3a,6 - dimethyl - 6,10 - methano - 1H - tetradecahydrocyloooct[e]indene-3β,9β,12β-triol.

Oxidation of the triols of the present invention results in the corresponding triketones. As a specific example, the aforementioned 3a,6-dimethyl-6,10-methano-1H-tetradecahydrocyclooct[e]indene-3β,9β,12β-triol is contacted with aqueous chromic acid in acetone to yield 3a,6-dimethyl - 6,10 - methano - 1H - tetradecahydrocyclooct[e]-indene-3,9,12-trione.

The structure of the lower alkanoyl esters of the present invention is dependent upon the configuration of the 12-hydroxy group of the triol precursors. The reaction of 3a,6 - dimethyl - 6,10 - methano - 1H - tetradecahydrocyclooct[e]indene-3β,11β,12α-triol with acetic anhydride in pyridine, for example, results in the corresponding 3,12-diacetate, while the analogous reaction of 3a,6-dimethyl - 6,10 - methano - 1H - tetradecahydrocyclooct[e]-indene-3β,11β,12β-triol with acetic anhydride and pyridine produces a mixture of the 3,11-diacetate and the 3-monoacetate.

The monoketo-diesters comprehended by the present invention are conveniently produced by oxidation, typically with chromic acid, of the aforementioned diesters. 3a,6 - dimethyl - 6,10 - methano - 1H - tetradecahydrocyclooct[e]indene-3β,11β,12β-triol 3,11-diacetate, as a specific example, yields 3a,6-dimethyl-6,10-methano-12-oxo - 1H - tetradecahydrocyclooct[e]indene - 3β,11β - diol 3,11-diacetate upon reaction with aqueous chromic acid in acetone.

The compounds of the present invention are useful as a result of their valuable pharmacological properties. They are, for example, hormonal agents as is evidenced by their androgenic activity. In addition, they are anti-ulcer agents in consequence of their pepsin-inhibitory activity.

The invention will appear in further detail from a consideration of the following examples. These examples are given for the purposes of illustration only, and are not to be construed as limiting the invention either in spirit or in scope. In these examples, temperatures are given in degrees centigrade (° C.) and materials in parts by weight unless otherwise noted.

*Example 1*

To a slurry of 3 parts of lithium aluminum hydride in 89 parts of tetrahydrofuran is added 5 parts of methyl 17β - benzoyloxy-5-oxo-5,7-seco-B-norandrost-3-en-7-oate, and this reaction mixture is heated at the reflux temperature for about 40 hours. The mixture is cooled and treated cautiously with ethyl acetate in order to destroy the excess reducing agent, then is treated with about 500 parts by volume of 5 molar hydrochloric acid. The two layers are separated, and the aqueous layer is extracted with ethyl acetate. The combined organic solutions are washed with saturated aqueous sodium chloride, then dried over anhydrous sodium sulfate. Removal of the solvent by distillation at reduced pressure affords a solid residue which is dissolved in benzene and adsorbed on a silica gel chromatographic column. Elution of the column with a mixture of 40% ethyl acetate in benzene affords a fraction which is recrystallized from ethyl acetate to yield 3a,6-dimethyl-6,10-methano-1H-tetradecahydrocyclooct[e]indene-3β,11β,12β-triol, melting at about 233–237° and characterized further by the structural formula

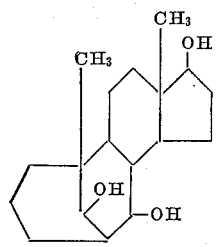

Further elution of the chromatographic column with 70% ethyl acetate in benzene affords a fraction which is recrystallized from ethyl acetate to yield pure 3a,6-dimethyl - 6,10 - methano - 1H - tetradecahydrocyclooct[e]indene-3β,11β,12α-triol, melting at about 207–210°. This substance is represented by the structural formula

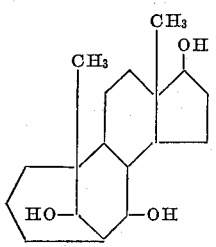

*Example 2*

To a solution of one part of 3a,6-dimethyl-6,10-methano - 1H - tetradecahydrocyclooct[e]indene - 3β,11β,12β-triol in 64 parts of acetone is added, with stirring, 4 parts by volume of an aqueous solution, 6 N in chromium trioxide and 6 N in sulfuric acid. After the reaction is allowed to proceed for about 15 minutes, the excess oxidizing agent is destroyed by the addition of 0.1 part of isopropyl alcohol, and the mixture is diluted with 250 parts of water. Extraction of this aqueous mixture with ether affords a solution which is dried over anhydrous sodium sulfate and concentrated to dryness at reduced pressure. Recrystallization of the resulting crude product from isopropyl ether affords pure 3a,6-dimethyl-6,10-methano - 1H - tetradecahydrocyclooct[e]indene - 3,11,12-trione, melting at about 161–162°. It is represented by the structural formula

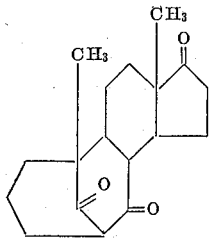

The substitution of one part of 3a,6-dimethyl-6,10-methano - 1H - tetradecahydrocyclooct[e]indene - 3β,11β,12α-triol in the procedure of this example results in the identical triketone described herein.

*Example 3*

A solution of 7 parts of 3a,6-dimethyl-6,10-methano-1H-tetradecahydrocyclooct[e]indene-3β,11β,12α-triol in 150 parts of pyridine and 50 parts of acetic anhydride is allowed to stand at room temperature for about 6 hours, then is poured slowly into about 1000 parts of water, and the oil which separates is extracted into ether. The ether solution is washed successively with dilute hydrochloric acid, dilute aqueous sodium hydroxide, and water, then is dried over anhydrous sodium sulfate and evaporated to dryness at reduced pressure. The oily residue is adsorbed on a silica gel chromatographic column. Elution of the column with 5% ethyl acetate in benzene affords a fraction which is recrystallized from acetone-isopropyl ether to afford pure 3a,6-dimethyl-6,10-methano - 1H - tetradecahydrocyclooct[e]indene - 3β,11β,12α-triol, 3,12-diacetate, characterized by a melting point of about 164–165° and also by the structural formula

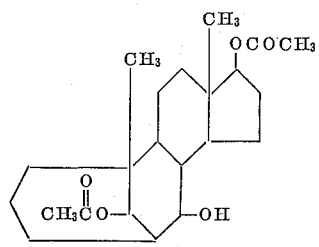

*Example 4*

The substitution of 63.7 parts of propionic anhydride in the procedure of Example 3 results in 3a,6-dimethyl-6,10 - methano - 1H - tetradecahydrocyclooct[e]indene-3β,11β,12α-triol 3,12-dipropionate. This substance is characterized by the structural formula

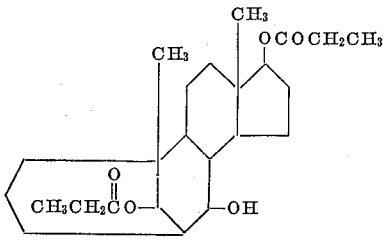

*Example 5*

A mixture of one part of 3a,6-dimethyl-6,10-methano-1H-tetradecahydrocyclooct[e]indene-3β,11β,12β - triol, 20 parts of pyridine, and 10 parts of acetic anhydride is stored at room temperature for about 17 hours, then is diluted with about 500 parts of water. The resulting oily product is extracted into ether, and the ether extract is washed successively with dilute hydrochloric acid and dilute aqueous potassium hydroxide, then is dried over anhydrous sodium sulfate. Distillation of the solvent at reduced pressure affords a residue which is adsorbed on a silica gel chromatographic column, then is eluted with 5% ethyl acetate in benzene. Crystallization from acetone-ether of the material obtained from the eluate affords pure 3a,6-dimethyl-6,10-methano-1H-tetradecahydrocyclooct[e]indene-3β,11β,12β - triol 3,11 - diacetate, melting at about 175–177°. This substance is represented by the structural formula

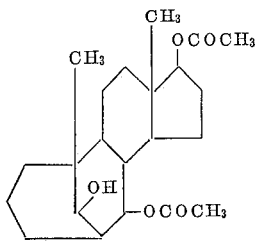

Further elution of the column with 10% ethyl acetate in benzene yields a fraction, the crystallization of which from acetone-petroleum ether results in pure 3a,6-dimethyl-6,10-methano - 1H - tetradecahydrocyclooct-[e]indene-3β,11β,12β-triol 3-acetate, melting at about 186–186.5° and characterized also by the structural formula

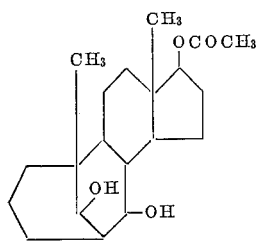

Example 6

By substituting 12.7 parts of propionic anhydride and otherwise proceeding according to the processes described in Example 5, 3a,6-dimethyl-6,10-methano-1H-tetradecahydrocyclooct[e]indene-3β,11β,12β-triol 3,11 - dipropionate and 3a,6-dimethyl-6,10-methano-1H-tetradecahydrocyclooct[e]indene-3β,11β,12β-triol 3-propionate are obtained.

Example 7

To a solution of one part of 3a,6-dimethyl-6,10-methano - 1H - tetradecahydrocyclooct[e]indene-3β,11β,12α-triol 3,12-diacetate in 40 parts of acetone is added dropwise an aqueous solution 8 N in chromium trioxide and 8 N in sulfuric acid, until an excess of the oxidizing reagent is present. This mixture is allowed to stand for about 5 minutes, then is treated with 0.1 part of isopropyl alcohol and diluted with about 250 parts of water. The resulting product which precipitates is collected by filtration and recrystallized from acetone-petroleum ether to afford pure 3a,6-dimethyl-6,10-methano-11-oxo-1H-tetradecahydrocyclooct[e]indene-3β,12α - diol 3,12-diacetate, melting at about 180.5–181.5° and characterized also by the structural formula

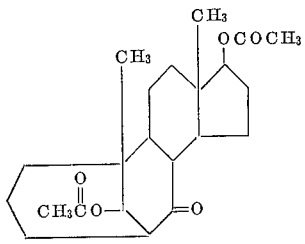

Example 8

The substitution of one part of 3a,6-dimethyl-6,10-methano - 1H - tetradecahydrocyclooct[e]indene - 3β,11β, 12β-triol 3,11-diacetate in the procedure of Example 7 results in, after recrystallization from aqueous methanol, pure 3a,6-dimethyl-6,10-methano-12-oxo - 1H - tetradecahydrocyclooct[e]indene-3β,11β-diol 3,11-diacetate, melting at about 116–117.5° and represented by the structural formula

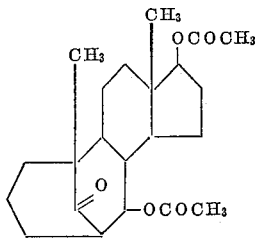

Example 9

By substituting one part of 3a,6-dimethyl-6,10-methano-1H - tetradecahydrocyclooct[e]indene - 3β,11β,12α - triol 3,12-dipropionate and otherwise proceeding according to the processes described in Example 7, 3a,6-dimethyl-6,10-methano - 11 - oxo - 1H - tetradecahydrocyclooct[e]indene-3β-12α-diol 3,12-dipropionate is obtained. This substance is represented by the structural formula

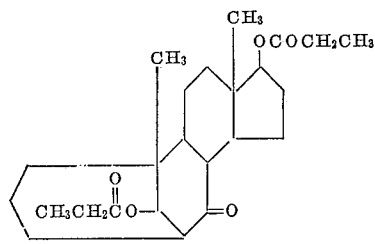

Example 10

The substitution of one part of 3a,6-dimethyl-6,10-methano - 1H - tetradecahydrocyclooct[e]indene-3β,11β,12β-triol 3,11-dipropionate in the procedure of Example 7 results in 3a,6-dimethyl-6,10-methano-12-oxo-1H - tetradecahydrocyclooct[e]indene - 3β,11β - diol 3,11-dipropionate of the structural formula

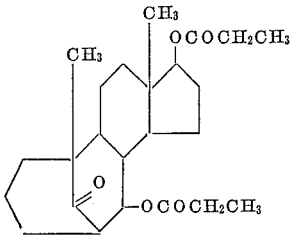

Example 11

To a solution of 10 parts of 17β-benzoyloxy-5-oxo-3,5-seco-A-norandrostan-3-oic acid in 176 parts of benzene is added, at room temperature, a solution of diazomethane, produced from 10 parts of N-nitrosomethylurea, in 71 parts of ether. The reaction mixture is allowed to stand at room temperature for about 6 hours, then is washed successively with dilute aqueous sodium bicarbonate and water, and is dried over anhydrous sodium sulfate. Removal of the solvent by distillation at reduced pressure affords methyl 17β-benzoyloxy-5-oxo-3,5-seco-A-norandrostan-3-oate. To a solution of this material in 210 parts of acetic acid is added dropwise, over a period of about 15 minutes, 26 parts of volume of a 1 molar solution of bromine in acetic acid. Evaporation of the solution to a small volume at reduced pressure followed by dilution with 500 parts by volume of 5% aqueous sodium acetate results in separation of a crystalline product which is collected by filtration. This material is dried, then is dissolved in 190 parts of dimethylformamide. To this solution is added 2.5 parts of lithium chloride and 1.5 parts of lithium carbonate, and the reaction mixture is heated at the reflux temperature for about 4 hours. The reaction mixture is then cooled, concentrated to a small volume at reduced pressure, and diluted with 300 parts of water. The supernatant layer is removed by decantation and the resinous product is dried, then is dissolved in benzene and absorbed on a silica gel chromatographic column. Elution of the column with an eluant comprising 2% ethyl acetate in benzene affords methyl 17β - benzoyloxy - 5 - oxo - 3,5 - seco - A - norandrost - 6-en-3-oate.

To a solution of 3 parts of methyl 17β-benzoyloxy-5-oxo-3,5-seco-A-norandrost-6-en-3-oate in 355 parts of tetrahydrofuran is added 5 parts of lithium aluminum hydride, and this reaction mixture is heated at the reflux temperature for about 96 hours, then is treated cautiously with 9 parts of ethyl acetate. Approximately 500 parts by volume of 3 molar hydrochloric acid are added, and the two layers are separated. Extraction of the aqueous layer with ether affords a solution which is combined with the original organic solution. Washing of the total organic solution with water, followed by drying over anhydrous sodium sulfate and removal of the solvent by distillation at reduced pressure affords an oily residue. This residue is dissolved in 176 parts of benzene and is adsorbed on a silica gel chromatographic column. Elution of the column with 40% ethyl acetate in benzene affords a fraction which is crystallized from acetone-isopropyl ether to afford 3a,6-dimethyl-6,10-methano-1H-tetradecahydrocyclooct[e]indene-3β,9β,12β-triol, melting at about 173–175° and characterized also by the structural formula

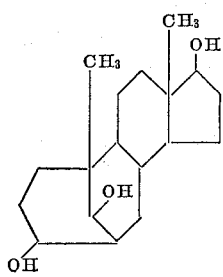

*Example 12*

To a solution of one part of 3a,6-dimethyl-6,10-methano-1H-tetradecahydrocyclooct[e]indene - 3β,9β,12β-triol in 4.8 parts of acetone is added at room temperature an aqueous solution, 8 N in chromium trioxide and 8 N in sulfuric acid, until an excess of the oxidizing reagent is present. After about 5 minutes at room temperature, 0.01 part of isopropyl alcohol and 50 parts of water are successively added. The resulting mixture is concentrated to a small volume at reduced pressure, and the resulting product is collected by filtration. Recrystallization from acetone-isopropyl ether affords pure 3a,6-dimethyl - 6,10-methano - 1H-tetradecahydrocyclooct[e]-indene-3,9,12-trione, melting at about 195–197°. This substance is represented by the structural formula

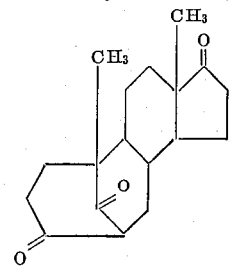

What is claimed is:

1. A member selected from the group consisting of compounds represented by the formulas

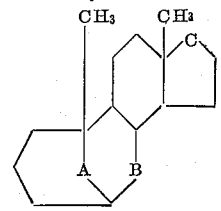

and

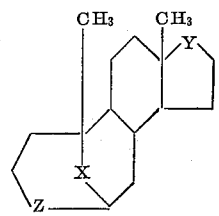

wherein B and C are radicals selected from the group consisting of carbonyl, β-hydroxymethylene, and β-(lower alkanoyl)oxymethylene, A is a radical selected from the group consisting of carbonyl, hydroxymethylene, and α-lower alkanoyl)oxymethylene, and X, Y, and Z are members of the class of radicals consisting of carbonyl and β-hydroxymethylene.

2. 3a,6 - dimethyl - 6,10 - methano - 1H - tetradecahydrocyclooct[e]indene-3β,11β,12α-triol.

3. 3a,6 - dimethyl - 6,10 - methano - 1H - tetradecahydrocyclooct[e]indene-3β,11β,12β-triol.

4. 3a,6 - dimethyl - 6,10 - methano - 1H - tetradecahydrocyclooct[e]indene-3,11,12-trione.

5. 3a,6 - dimethyl - 6,10 - methano - 12 - oxo - 1H-tetradecahydrocyclooct[e]indene-3β,11β-diol 3,11-diacetate.

6. 3a,6 - dimethyl - 6,10 - methano - 1H - tetradecahydrocyclooct[e]indene-3β,11β,12α-triol 3,12-diacetate.

7. 3a,6 - dimethyl - 6,10 - methano - 1H - tetradecahydrocyclooct[e]indene-3β,11β,12β-triol 3,11-diacetate.

8. 3a,6 - dimethyl - 6,10 - methano - 11 - oxo - 1H-tetradecahydrocyclooct[e]indene-3β,12α-diol 3,12-diacetate.

9. 3a,6 - dimethyl - 6,10 - methano - 1H - tetradecahydrocyclooct[e]indene-3β,11β,12β-triol 3-acetate.

10. 3a,6 - dimethyl - 6,10 - methano - 1H - tetradecahydrocyclooct[e]indene-3β,9β,12β-triol.

11. 3a,6 - dimethyl - 6,10 - methano - 1H - tetradecahydrocyclooct[e]indene-3,9,12-trione.

References Cited by the Examiner

UNITED STATES PATENTS 2,891,995   6/1959   Johnson _____ 260—586

LORRAINE A. WEINBERGER, *Primary Examiner.*

LEON ZITVER, *Examiner.*